(12) United States Patent
Dabbs

(10) Patent No.: US 9,061,668 B2
(45) Date of Patent: Jun. 23, 2015

(54) BRAKE SYSTEM

(71) Applicant: Caterpillar Inc., Peoria, IL (US)

(72) Inventor: Harold D. Dabbs, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 13/766,799

(22) Filed: Feb. 14, 2013

(65) Prior Publication Data

US 2014/0225426 A1     Aug. 14, 2014

(51) Int. Cl.
| | |
|---|---|
| *B60T 13/22* | (2006.01) |
| *B60T 13/14* | (2006.01) |
| *B60T 8/17* | (2006.01) |
| *B60T 8/88* | (2006.01) |
| *B60T 13/66* | (2006.01) |
| *B60T 13/68* | (2006.01) |

(52) U.S. Cl.
CPC ............... *B60T 13/141* (2013.01); *B60T 8/17* (2013.01); *B60T 8/885* (2013.01); *B60T 13/662* (2013.01); *B60T 13/686* (2013.01)

(58) Field of Classification Search
CPC ....... B60T 13/12; B60T 13/14; B60T 13/141; B60T 13/148; B60T 13/16; B60T 13/138; B60T 13/18; B60T 13/22; B60T 13/66; B60T 13/68; B60T 13/686; B60T 13/74; B60T 13/748

USPC ............... 303/3, 10, 11, 15, 9.76, 68, 69; 188/166, 170

See application file for complete search history.

(56) References Cited

U.S. PATENT DOCUMENTS

| | | | |
|---|---|---|---|
| 3,917,037 A | 11/1975 | Prillinger | |
| 4,400,039 A * | 8/1983 | Ogata | 303/3 |
| 4,813,518 A * | 3/1989 | Akiyama et al. | 188/170 |
| 4,861,115 A * | 8/1989 | Petersen | 303/15 |
| 5,884,984 A * | 3/1999 | Arai et al. | 303/11 |
| 6,848,753 B2 | 2/2005 | Tanaka | |
| 7,273,136 B2 * | 9/2007 | Goto et al. | 188/170 |
| 8,696,070 B2 * | 4/2014 | Costaz et al. | 303/3 |
| 2011/0187181 A1 | 8/2011 | Kaupert | |
| 2012/0286563 A1 | 11/2012 | Lichterfeld et al. | |

* cited by examiner

*Primary Examiner* — Thomas J Williams
(74) *Attorney, Agent, or Firm* — Miller, Matthias & Hull LLP

(57) ABSTRACT

A hydraulic system for a brake system of a machine includes a relay valve coupled to a brake cylinder, a pump, and a tank. The relay valve includes a first position to allow supply of fluid from the pump to the brake cylinder, and a second position to allow discharge of fluid from the brake cylinder to the tank. Further, the relay valve includes a third position to restrictively allow discharge of fluid from the brake cylinder to the tank via a flow limiting orifice. A pilot valve coupled to the relay valve and configured to modulate the relay valve between the first position, the second position and the third position.

20 Claims, 4 Drawing Sheets

BRAKE SYSTEM

TECHNICAL FIELD

The present disclosure relates to a brake system of a machine, and more particularly to a hydraulic system for the brake system to gradually retard the machine in an event of a failure in a hydraulic or an electrical system associated with the brake system.

BACKGROUND

Hydraulic circuits of conventional brake systems allow an operator to halt a moving machine. However, the hydraulic circuits are designed in a manner that a full braking force may be implemented rapidly on the wheels of the machine in order to halt the machine. During emergency conditions or failure of any component in the hydraulic circuit or an electrical system associated with the brake system, the sudden braking imposed on the wheels of the machine may sometimes cause the machine to skid and loss of control.

Further, the hydraulic circuits may use several single-chambered valves to effect braking on the wheel. When an emergency condition arises due to a failure of any component of the hydraulic or electric system associated with the brake system, the numerous valves may entail individual modulation and may cause a delay in application of brakes. Furthermore, the brakes may need to be applied in a gradual manner to avoid skidding of the wheels on the ground surface. Therefore, the conventional hydraulic circuits may not be effective in operation and may not gradually halt the machine in an event of a failure.

U.S. Published application Ser. No. 13/049,335 relates to a method for operating a parking brake module that is at least partially integrated into a compressed air generation system in the event of defects, having a control unit, solenoid valves, and a relay valve for aerating and deaerating at least one spring-loaded brake cylinder. A pressure in the parking brake module which is elevated compared to a normal pressure is determined. A constant compressed air delivery is stopped. A reduced switch-off pressure of the compressed air generation system is set. The pressure level in the parking brake module is lowered to the reduced switch-off pressure through repeated activation of the relay valve.

SUMMARY OF THE DISCLOSURE

In one aspect, the present disclosure provides a hydraulic system for a brake system of a machine. The hydraulic system includes a relay valve, and a pilot valve. The relay valve is coupled to the brake cylinder, a pump, and a tank and includes at least a first, a second, and a third position. The first position is configured to supply fluid from the pump to the brake cylinder. The second position is configured to discharge fluid from the brake cylinder to the tank. The third position is configured to restrictively discharge fluid from the brake cylinder to the tank via a flow limiting orifice. The pilot valve is disposed in a supply line and coupled to the relay valve. The pilot valve is configured to modulate the relay valve between the first position, the second position and the third position.

In another aspect, the present disclosure discloses a machine including one or more rotatable members, and a brake system operatively coupled to the rotatable members. The brake system includes at least one brake cylinder, a pump, a tank, and a hydraulic system. The brake cylinder is coupled to the rotatable members. The pump is configured to supply pressurized fluid to the brake cylinder via a supply line. The tank is configured to supply fluid to the pump, and receive fluid from the brake cylinder via a return line. The hydraulic system includes a relay valve, and a pilot valve. The relay valve is coupled to the brake cylinder, the pump, and the tank and includes at least a first, a second, and a third position. The first position is configured to supply fluid from the pump to the brake cylinder. The second position is configured to discharge fluid from the brake cylinder to the tank. The third position is configured to restrictively discharge fluid from the brake cylinder to the tank via a flow limiting orifice. The pilot valve is disposed in a supply line and coupled to the relay valve. The pilot valve is configured to modulate the relay valve between the first position, the second position and the third position.

In another aspect, the present disclosure discloses a method for operating a brake system in a machine. The method includes disengaging brake by supplying fluid from the pump to the brake cylinder in the first position of the relay valve. Further, engaging brake by discharging fluid from the brake cylinder to the tank in the second position of the relay valve. The method further includes engaging brake by discharging fluid from the brake cylinder to the tank via the flow limiting orifice in the third position of the relay valve in an event of a failure.

Other features and aspects of this disclosure will be apparent from the following description and the accompanying drawings.

DETAILED DESCRIPTION

Figure 1:
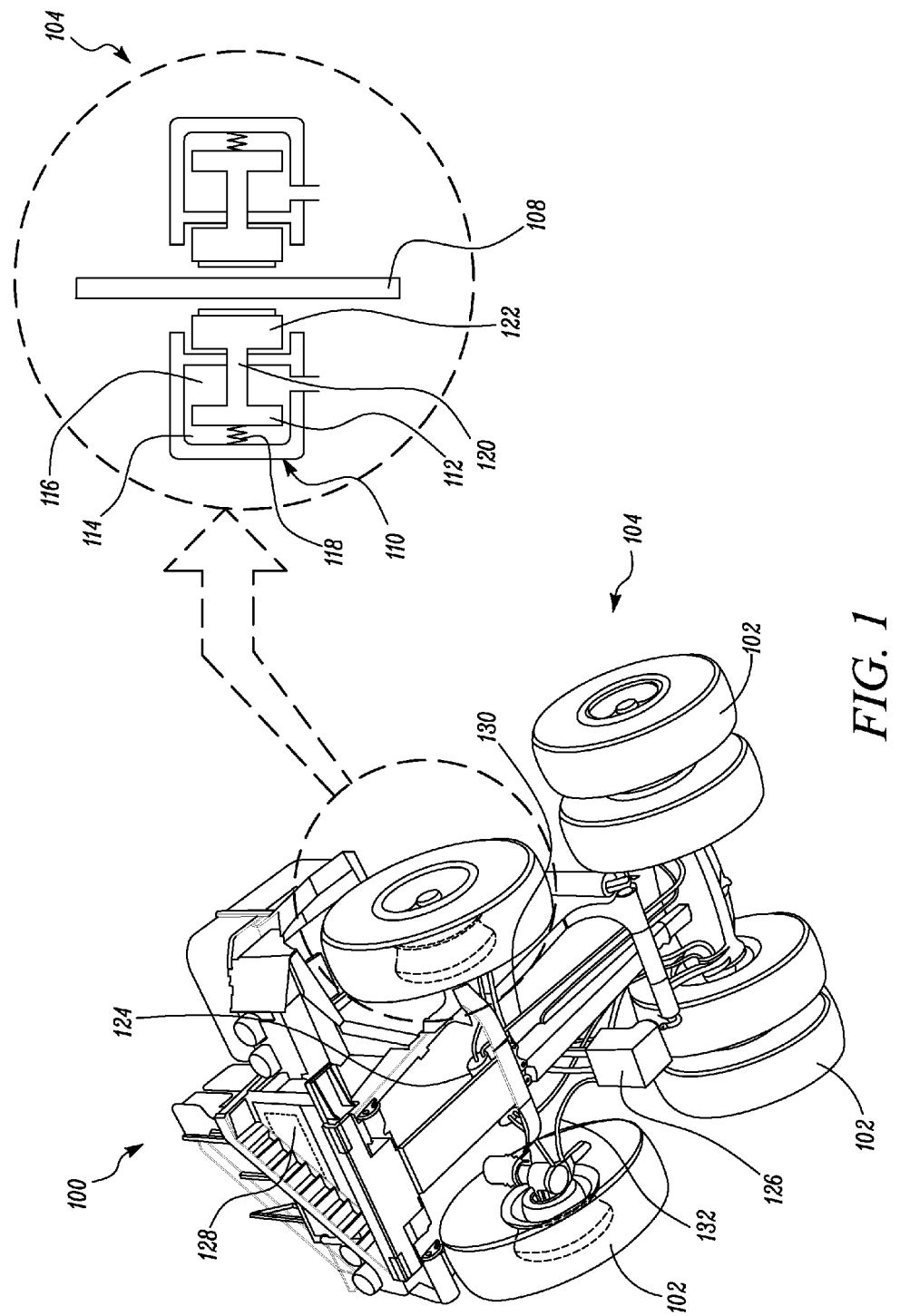
FIG. 1 is a perspective view of an underside of an exemplary machine.

The present disclosure relates to a hydraulic system for a brake system to progressively retard a machine. FIG. 1 illustrates an exemplary machine 100 in accordance with an aspect of the present disclosure. Although, the machine 100 is shown as a large mining truck, the machine 100 may be any wheeled or tracked machine that performs at least one operation associated with for example mining, construction, and other industrial applications, for example, backhoe loaders, skid steer loaders, wheel loaders, motor graders, track-type tractor, and many other machines.

As shown in FIG. 1, the exemplary machine 100 includes one or more wheels 102 configured to support and propel the machine 100 on a ground surface 106 (see FIG. 2) and a brake system 104 operatively coupled to the wheels 102. In an exemplary aspect, as shown in FIG. 1, the brake system 104 may be a spring applied disk brake system including a brake disk 108 and a pair of brake cylinders 110. The brake disk 108 may be connected to the wheel 102. Each of the brake cylinders 110 includes a piston 112 to define a head side chamber 114 and a rod side chamber 116. A compression spring 118 may be disposed in the head side chamber 114. Further, a rod 120 is connected to the piston 112 and a brake pad 122. During application of brakes, fluid from the rod side chamber 116 is permitted to drain thereby moving the piston 112 by the compression spring 118 to engage the brake pads 122 onto the brake disk 108. In other aspects, the brake system 104 may be any similar spring applied brake system that applies brakes by releasing fluid from the brake cylinder, for example, but not limited to, a spring applied drum brake system.

The machine 100 further includes a pump 124 and a tank 126. The pump 124 may be driven by a prime mover such as an engine 128 or a motor (not shown) and selectively supply a pressurized fluid into the brake cylinder 110 via a supply line 130. The tank 126 is configured to receive fluid from the brake cylinder 110 via a return line 132.

Figure 2:
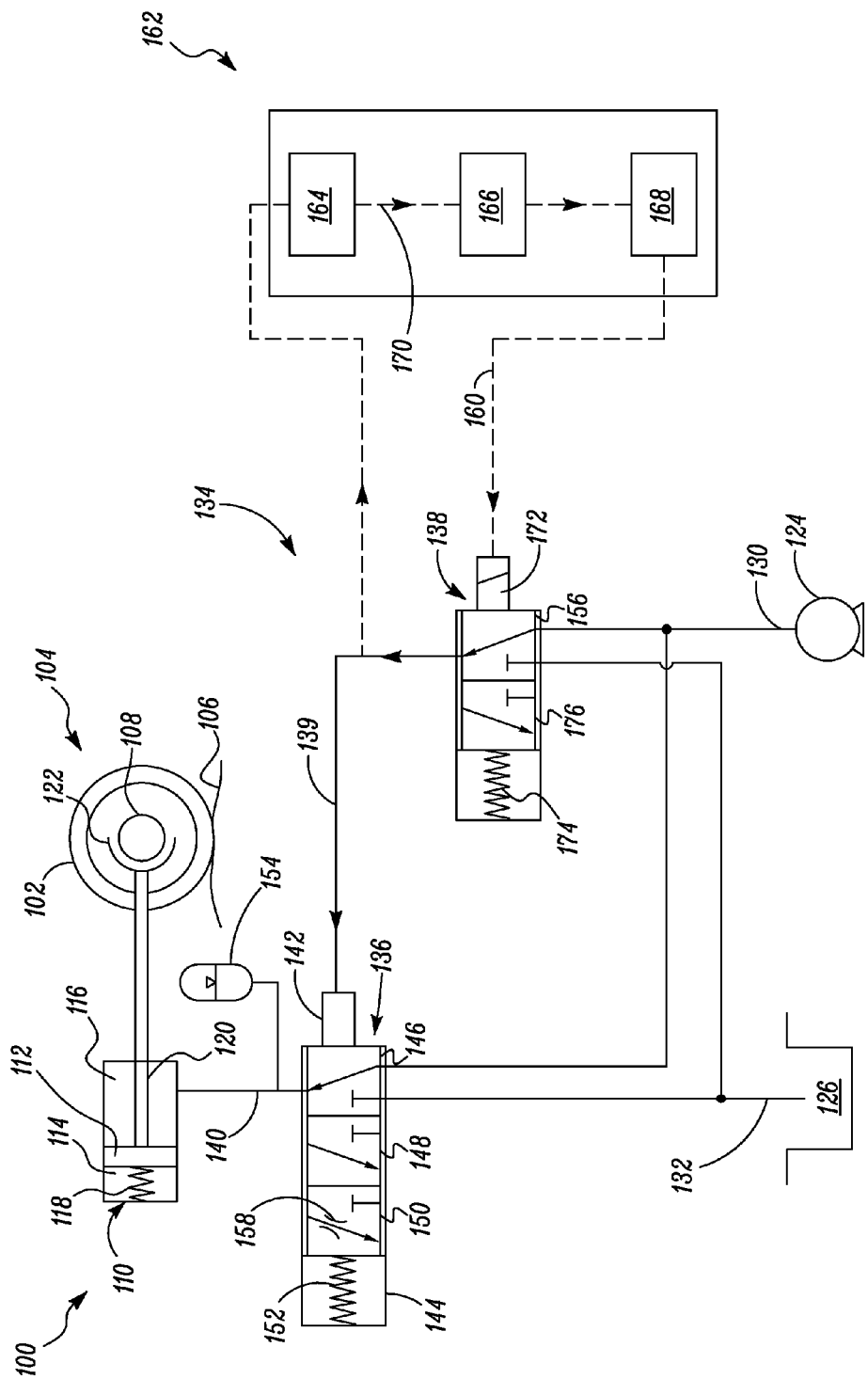
FIG. 2 is a schematic of a brake system and a hydraulic system implemented in the exemplary machine when brakes are released.

FIG. 2 shows a schematic of a hydraulic system 134 for the brake system 104, according to an aspect of the present disclosure. The hydraulic system 134 includes a relay valve 136, and a pilot valve 138. The relay valve 136 may be disposed between the pump 124, the tank 126, and the rod side chamber 116 of the brake cylinder 110. The relay valve 136 is connected to the rod side chamber 116 via a hydraulic line 140.

In an aspect of the present disclosure, as shown in FIG. 2, the relay valve 136 may be a three-way three-position pressure control valve configured to variably allow supply and/or discharge of fluid into and out of the rod side chamber 116 of the brake cylinder 110 thereby controlling the movement of the rod 120 and hence, the application, and the degree or extent of braking force on the brake disc 108. The relay valve 136 may include a spool 142 disposed within a housing 144. The spool 142 may be hydraulically operated to variably move between a first position 146, a second position 148, and a third position 150. Further, a spring 152 is provided in the relay valve 136 to keep the relay valve 136 biased in the third position 150 of the spool 142. The relay valve 136 may be modulated to the first position 146 or the second position 148 by applying a pilot pressure on the spool 142 using the pilot valve 138 via a pilot line 139. The first position 146 and/or the second position 148 disclosed herein represents three states of operation namely—fully first position, fully second position, and partial first and second positions. Further, normal operating conditions disclosed herein represents a state of machine operation when brakes may be fully disengaged, fully engaged or partially engaged. The process and application of the first position 146, and the second position 148 in the relay valve 136 to manipulate the braking of the machine 100 will be explained in the appended disclosure.

When the wheel 102 is required to rotate without braking, the relay valve 136 may be modulated by the pilot valve 138 into the first position 146 whereby pressurized fluid is allowed to enter from the pump 124 to the rod side chamber 116 via the supply line 130. Therefore, the rod side chamber 116 gets filled with the fluid and compresses the compression spring 118 of the brake cylinder 110 to release the brake pads 122.

When braking is required on the wheel 102, the relay valve 136 may be modulated by the pilot valve 138 into the second position 148 whereby the fluid is allowed to exit from the rod side chamber 116 to the tank 126 via the return line 132. Therefore, the rod side chamber 116 loses fluid pressure therein and allows expansion of the compression spring 118 to engage the brake pads 122 onto the brake disc 108.

Further, when controlled braking is required, the relay valve 136 may be modulated by the pilot valve 138 partially into the first and the second positions 146, 148, together, wherein the relay valve 136 is open at the first position 146 and also at the second position 148. In this way, the pressurized fluid enters the rod side chamber 116 via the supply line 130 while the fluid from the rod side chamber 116 exits into the tank 126 via the return line 132. Hence, both supply of pressurized fluid and discharge of fluid take place simultaneously thereby allowing braking to be controlled to a predetermined degree or extent, for example, 50% braking force or 70% braking force. However, it may be noted that the third position 150 is shown in FIG. 2, the disclosure to which will be made in greater detail in the appended description.

In an aspect of the present disclosure, the hydraulic system 134 may include a hydraulic accumulator 154 disposed between the relay valve 136 and the brake cylinder 110. The hydraulic accumulator 154 is used to store fluid under a pressure by a compressible gas. The hydraulic accumulator 154 is configured to maintain the pressure in the brake cylinder 110 in addition to the fluid supplied by the pump 124.

Figure 3:
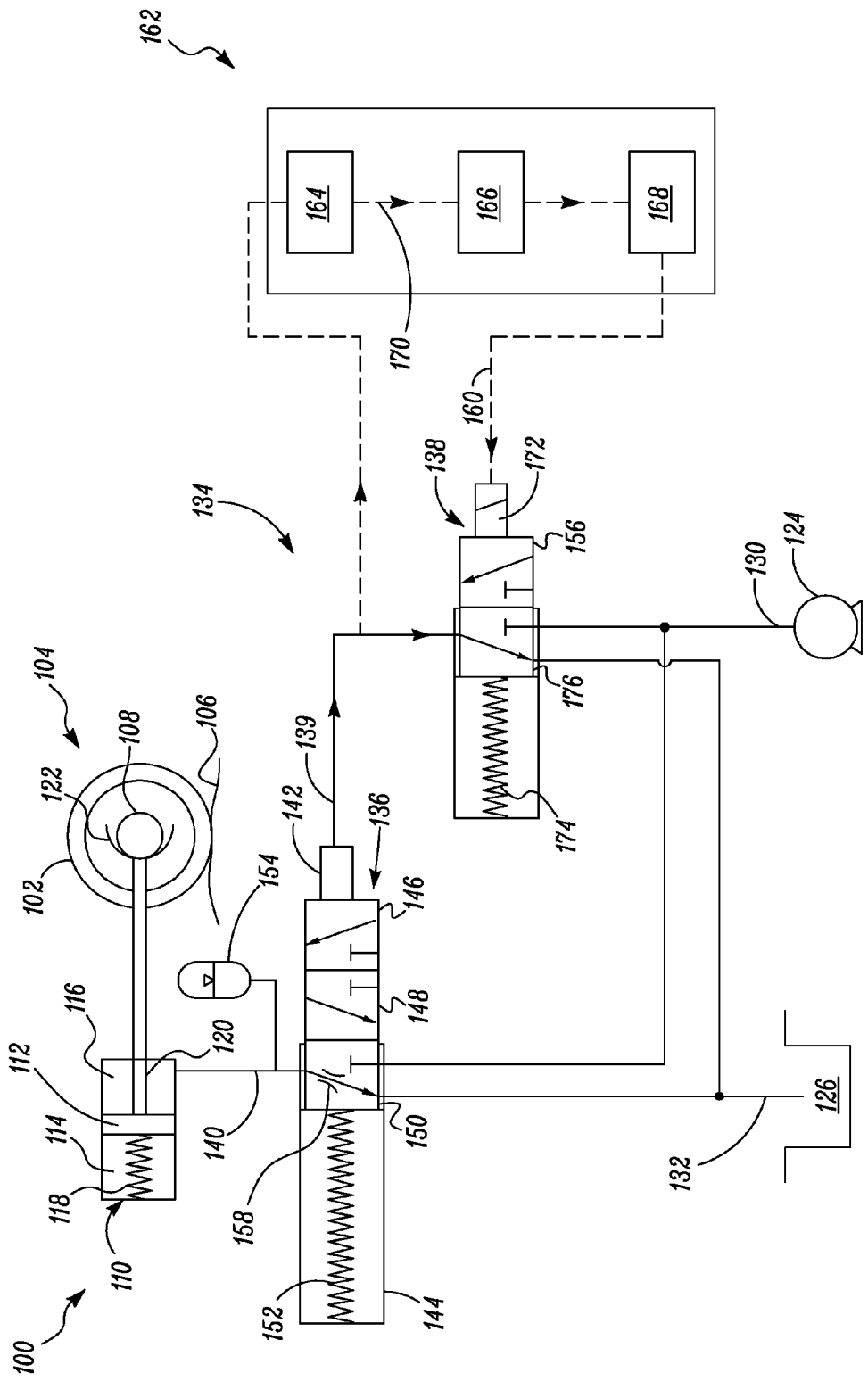
FIG. 3 is a schematic of a brake system and hydraulic system implemented in the exemplary machine when brakes are applied.

In an aspect of the present disclosure, the pilot valve 138 may be a two-way, two-position proportional solenoid valve. As shown in FIG. 2, the pilot valve 138 is at an inlet position 156 and the relay valve 136 is at the first position 146 thereby allowing the wheel 102 to roll freely without any braking force. At this point, consider that a pilot pressure in the pilot line 139 fails or drops low due to a failure in the pilot line 139. Subsequently, the spring 152 of the relay valve 136 overcomes the pilot pressure and modulates the relay valve 136 into the third position 150 at which the relay valve 136 includes a flow limiting orifice 158 as shown in FIG. 3. The flow limiting orifice 158 allows fluid to exit from the rod side chamber 116 into the return line 132 at a restricted flow rate as compared to a full flow discharge corresponding to the second position 148. Further, the hydraulic accumulator 154 may also help to progressively retard the machine 100 by further increasing the time required to drain the fluid from the brake cylinder 110.

In an aspect as shown in FIG. 3, the braking force may be gradually imposed onto the brake disk 108 and hence, the wheels 102 may retard slowly as compared to the faster retardation that would have otherwise occurred if the relay valve 136 were at the second position 146. Hence, a possibility of the wheel 102 locking and skidding on the ground surface 106 may be minimized thereby allowing the machine 100 to be maneuvered by the operator and retain the machine 100 under control.

In an aspect of the present disclosure, the pilot valve 138 may be actuated by an actuation signal 160 that is electrical in nature. In an aspect, the machine 100 further includes a controller 162. The controller may include one or more sensors 164, a processor 166, and an actuator 168. The sensors 164 may be configured to detect the pressure loss of the fluid in the pilot line 139 and generate a condition signal 170. The processor 166 is configured to receive the condition signal 170 and generate the actuation signal 160 which may be fed into the actuator 168. The actuator 168 in turn may control the pilot valve 138 based on the actuation signal 160. Specifically, the controller 162 may be configured to detect a pressure loss in the hydraulic system 134 for example in the pilot line 139 and/or the supply line 130 and generate the actuation signal 160 to actuate the pilot valve 138 to an outlet position 176. Thus, moving the relay valve 136 directly in the third position 150. In other aspects, the pilot valve 138 may be actuated by a user-initiated actuation signal.

With reference to the preceding two aspects and the pilot valve 138 at the inlet position 156 as shown in FIG. 2, consider an exemplary aspect wherein the controller 162 fails to generate the actuation signal 160 due to an electrical failure. At this point, a solenoid 172 associated with the pilot valve 138 may become inoperative due to an absence of the actuation signal 160. Therefore, a spring 174 of the pilot valve 138 may bias the pilot valve 138 into the outlet position 176, whereby a pilot pressure in the pilot line 139 fails or drops. Subsequently, the spring 152 of the relay valve 136 overcomes the pilot pressure and modulates the relay valve 136 into the third position 150. The relay valve 136 then routes the fluid from the rod side chamber 116 to the tank 126 via the flow limiting orifice 158 wherein a flow rate is lesser than a flow rate at the second position 148 of the relay valve 136. Therefore, the brake pad 122 gradually engages onto the brake disk 108 and may retard the wheels 102 slowly as compared to the sudden braking that would otherwise occur if the relay valve 136 were at the second position 148. Hence, the wheels 102 may retard while still being disposed in rolling contact with the ground surface 106 and a possibility of the wheels 102 locking or skidding on the ground surface 106 may be minimized. Further, the machine 100 may remain in control before being brought to a halt and may allow the operator to maneuver the machine 100 appropriately.

It may be noted that that the preceding aspects disclosing a pressure drop at the pilot line 139 are merely exemplary in nature and hence, non-limiting to this disclosure. A person having ordinary skill in the art may acknowledge that other types of failures may also be detected by appropriate means and structures commonly known in the art whereby the respective valves may be actuated to allow the fluid to return via the flow limiting orifice 158.

Further, it should be noted that the controller 162 may embody any general machine controller capable of controlling the pilot valve 138 and subsequently accomplish modulation of the relay valve 136. Furthermore, the controller 162 may include one or more commonly known elements in the art such as a field-programmable gate array (FPGA), a computer system, and a logic circuit configured to allow the controller 162 to function in accordance with the present disclosure. Furthermore, various commonly known circuits may be implemented with the controller 162 to accomplish the modulation of the relay valve 136. Examples of such circuitry may be, but not limited to, an application-specific integrated circuit (ASIC), signal-conditioning circuitry, communication circuitry, and other appropriate circuitry.

Although, it is disclosed herein that the brake system 104 is implemented in the machine 100 embodied as the large mining truck, a person having ordinary skill in the art may acknowledge that the machine 100 disclosed herein in exemplary in nature and hence, non-limiting of this disclosure. Any machine including one or more rotatable members and a spring applied brake system operatively coupled to the rotatable members, which are embodied as the wheels 102 and the brake system 104 in the present disclosure, may employ the hydraulic system disclosed herein.

Industrial Applicability

The hydraulic circuits of conventional brake systems may use several single-chambered valves to effect braking on the wheel. When an emergency condition arises due to a failure of any component of the hydraulic or electric system associated with the brake system, the numerous valves may entail individual modulation and may cause a delay in application of brakes. Furthermore, the brakes may need to be applied in a gradual manner to avoid skidding of the wheels 102 on the ground surface 106. Therefore, the conventional hydraulic circuits may not be simple and effective in operation and may not gradually halt the machine 100 in an event of a failure.

Further, the hydraulic circuits may use a two-way, two-position spring-assisted relay valve to allow an operator to halt the moving machine 100. A first position may allow a supply of a pressurized fluid into the brake cylinder 110 such that brake pads 122 are disengaged from the brake disk 108 and a second position allows discharge of a fluid from the brake cylinder 110 such that brake pads 122 are engaged on the brake disk 108. Further, the hydraulic circuits are designed in a manner that a full braking force may be implemented rapidly on the wheels 102 of the machine 100 in order to halt the machine 100. During emergency conditions or failure of any component in the hydraulic circuit or an electrical system associated with the brake system, the actuation pressure associated with the modulation of the relay valve may be insufficient to counteract the spring force of the relay valve and subsequently push the relay valve into the second position. The operation of the relay valve in the second position imposes a sudden braking on the wheels 102 of the machine 100 and may sometimes cause the machine 100 to skid leading to a loss of control on the machine 100.

Hence, it may be desirable to retard the machine 100 at a rate slower than the retardation rate corresponding to the second position of the relay valve 136. Therefore, gradual application of brake pads may allow sufficient time to an operator of the machine 100 so that he may maneuver the machine 100 appropriately before bringing it to a halt.

Figure 4:
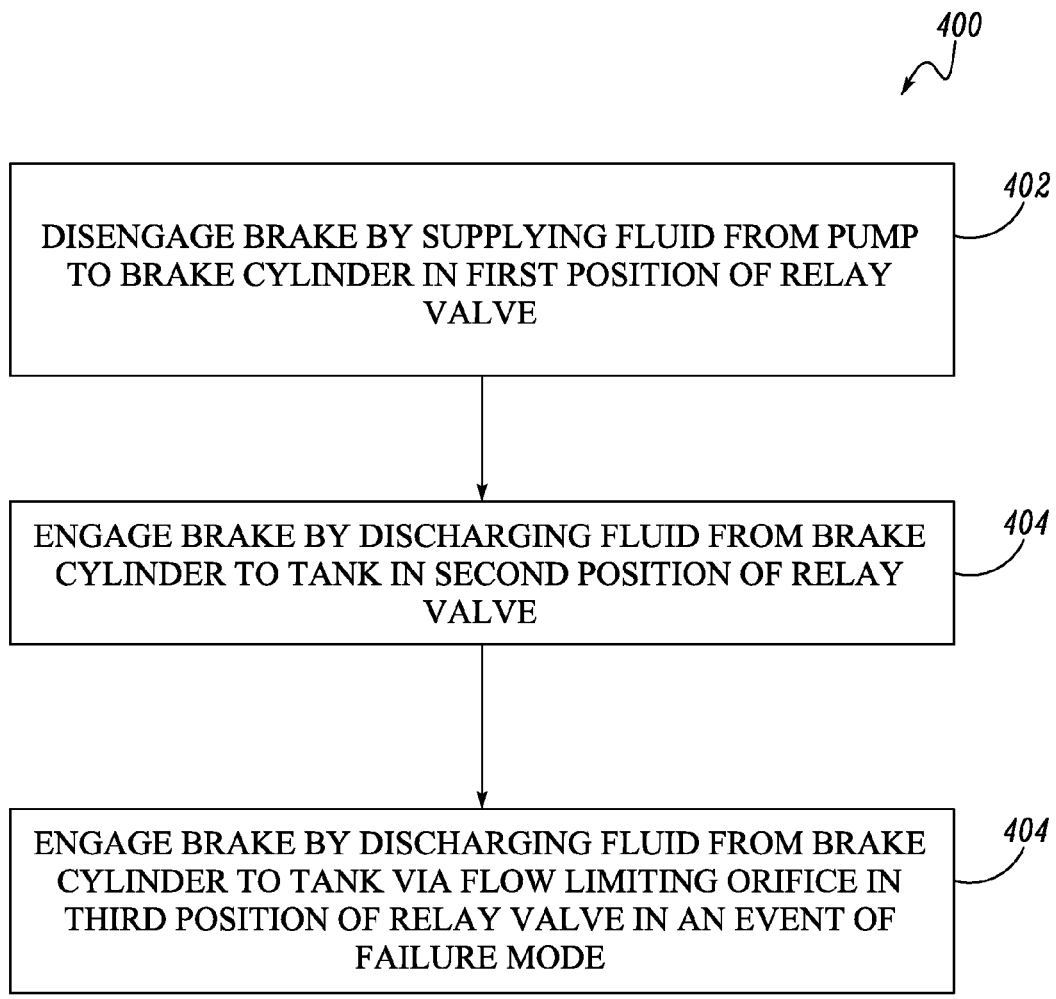
FIG. 4 is flowchart of a method for operating a brake system in the machine.

FIG. 4 shows a method 400 for operating the brake system 104 in the machine 100. At step 402, the method 400 includes disengaging brake pad 122 from the brake disc 108 by supplying fluid from the pump 124 to the brake cylinder 110 via the supply line 130 in a first position 146 of the relay valve 136. At step 404, the method 400 further includes engaging brake pad 122 onto the brake disc 108 by discharging fluid from the brake cylinder 110 to the tank 126 via the return line 132 in a second position 148 of the relay valve 136. At step 406, the method 400 further includes engaging brake pad 122 onto the brake disc 108 by discharging fluid from the brake cylinder 110 to the tank 126 via a flow limiting orifice 158 in a third position 150 of the relay valve 136 in an event of a failure.

In an aspect of the present disclosure, the hydraulic system 134 of the present disclosure, a pressure loss in the hydraulic system 134 or a failure in the controller 162 may modulate the relay valve 136 into the third position 150 thus allowing the fluid to return from the brake cylinder 110 via the flow limiting orifice 158. The flow limiting orifice 158 restricts fluid exiting from the brake cylinder 110 thus applying the brake pads 122 on the brake disk 108 and increasing a braking force gradually. This gradual increase of braking force mitigates a possibility of the machine 100 skidding in an emergency condition. Hence, the operator may have better control while maneuvering the machine 100 before being brought to a halt. Furthermore, the hydraulic system 134 is simple and reliable in operation thus saving the operator and the machine 100 from any damages resulting from a loss of control in a panic or emergency situation.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

I claim:

1. A hydraulic system for a brake system of a machine, the hydraulic system including:
   a relay valve coupled to a brake cylinder, a pump, and a tank, the relay valve including:
   a first position to allow supply of fluid from the pump to the brake cylinder;
   a second position to allow discharge of fluid from the brake cylinder to the tank; and a third position to restrictively allow discharge of fluid from the brake cylinder to the tank via a flow limiting orifice in an event of a failure;

a pilot valve coupled to the relay valve and configured to modulate the relay valve between the first position, the second position and the third position; and a controller operatively associated with the pilot valve to move the relay valve between the first, second and third positions.

2. The hydraulic system of claim 1, wherein the relay valve is a three-way three-position pressure control valve.

3. The hydraulic system of claim 1, wherein the pilot valve is a two-way, two-position proportional solenoid valve configured to receive an actuation signal from the controller.

4. The hydraulic system of claim 1, wherein rate of discharging fluid from the relay valve at the third position is less than rate of discharging fluid from the relay valve at the second position.

5. The hydraulic system of claim 1 further comprises an accumulator disposed between the relay valve and the brake cylinder.

6. A machine employing the hydraulic system of claim 1, wherein the machine comprises:
one or more rotatable members; and
a spring applied brake system operatively coupled to the rotatable members.

7. A machine comprising:
one or more rotatable members; and
a brake system operatively coupled to the rotatable members, the brake system including:
at least one brake cylinder;
a pump configured to supply pressurized fluid to the brake cylinder via a supply line; and
a tank configured to receive fluid from the brake cylinder via a return line; and
a hydraulic system including:
a relay valve coupled to the brake cylinder, the pump, and the tank, the relay valve including:
a first position to allow supply of fluid from the pump to the brake cylinder;
a second position to allow discharge of fluid from the brake cylinder to the tank; and
a third position to restrictively allow discharge of fluid from the brake cylinder to the tank via a flow limiting orifice in an event of a failure;
a pilot valve disposed in the supply line and coupled to the relay valve, the pilot valve configured to modulate the relay valve between first position, the second position and the third position; and
a controller operatively associated with the pilot valve to move the relay valve between the first, second and third positions.

8. The machine of claim 7, wherein the relay valve is a three-way three-position pressure control valve.

9. The machine of claim 7, wherein the pilot valve is a two-way, two-position proportional solenoid valve configured to receive an actuation signal from a the controller.

10. The machine of claim 9, wherein the controller is configured to:
receive a condition signal based on a pressure loss in the hydraulic system;
generate an actuation signal based on the condition signal; and
actuate the pilot valve based on the generated actuation signal to modulate the relay valve into the third position.

11. The machine of claim 8, wherein rate of discharging fluid from the relay valve at the third position is less than rate of discharging fluid from the relay valve at the second position.

12. The machine of claim 8, wherein the hydraulic system further comprises an accumulator disposed between the relay valve and the brake cylinder.

13. A method for operating a brake system having a brake cylinder, a controller, and a hydraulic system for the brake system having a relay valve coupled to a brake cylinder, a pump, and a tank, the method comprising:
disengaging a brake by supplying fluid from the pump to the brake cylinder in a first position of the relay valve;
engaging the brake by discharging fluid from the brake cylinder to the tank in a second position of the relay valve; and
engaging the brake by discharging fluid from the brake cylinder to the tank via a flow limiting orifice in a third position of the relay valve in an event of a failure, each of the disengaging and engaging steps being conducted by the controller.

14. The method of claim 13, wherein the failure comprises a hydraulic failure.

15. The method of claim 13, wherein the failure comprises an electrical failure.

16. The method of claim 13 wherein the relay valve is a three-way three-position pressure control valve.

17. The method of claim 16, wherein rate of discharging fluid from the relay valve at the third position is less than rate of discharging fluid from the relay valve at the second position.

18. The method of claim 13, wherein the hydraulic system further comprises a pilot valve for modulating the relay valve between the first position, the second position and the third position.

19. The method of claim 18, wherein the pilot valve is a two-way, two-position proportional solenoid valve and receive an actuation signal from the controller.

20. The method of claim 18, wherein the pilot valve is actuated by a user-initiated actuation signal.

* * * * *